Figure 5:
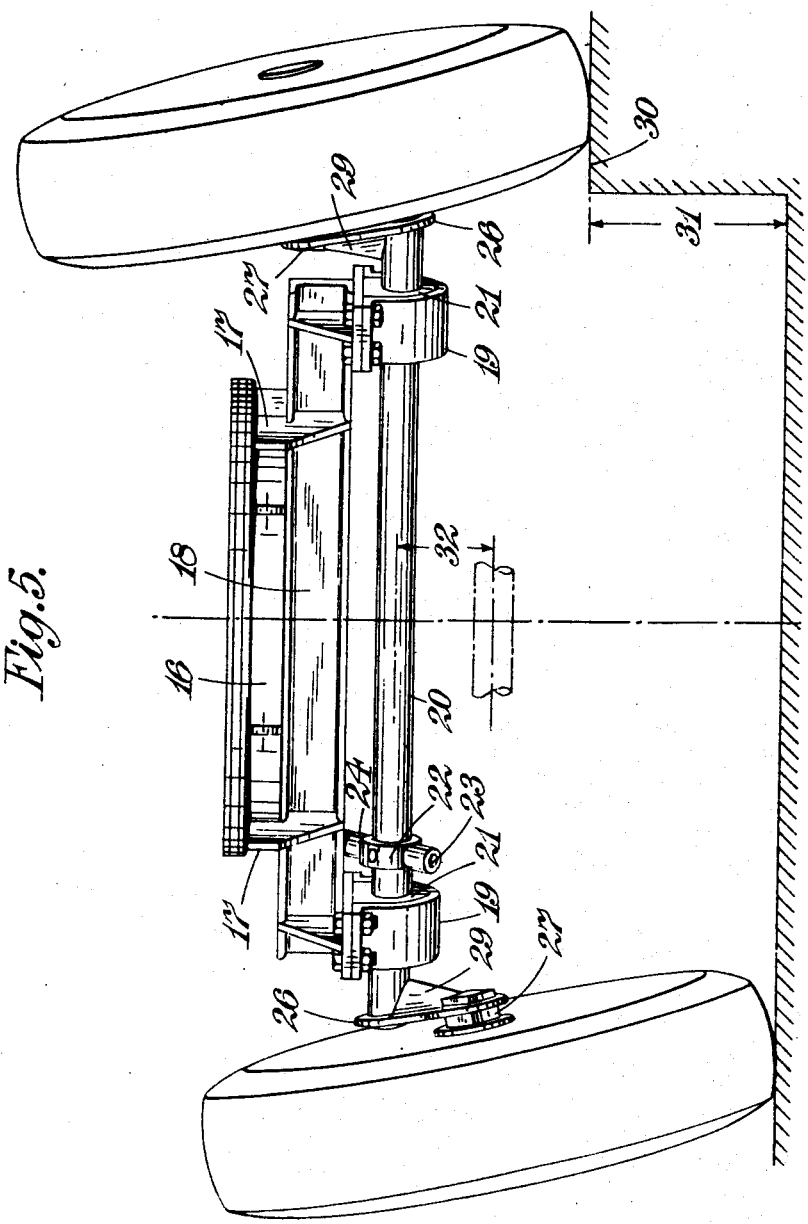

Sept. 29, 1953  S. E. ALLEY  2,653,828
AXLE MOUNTING OF TRAILERS AND OTHER VEHICLES
Filed Nov. 14, 1950  4 Sheets-Sheet 1
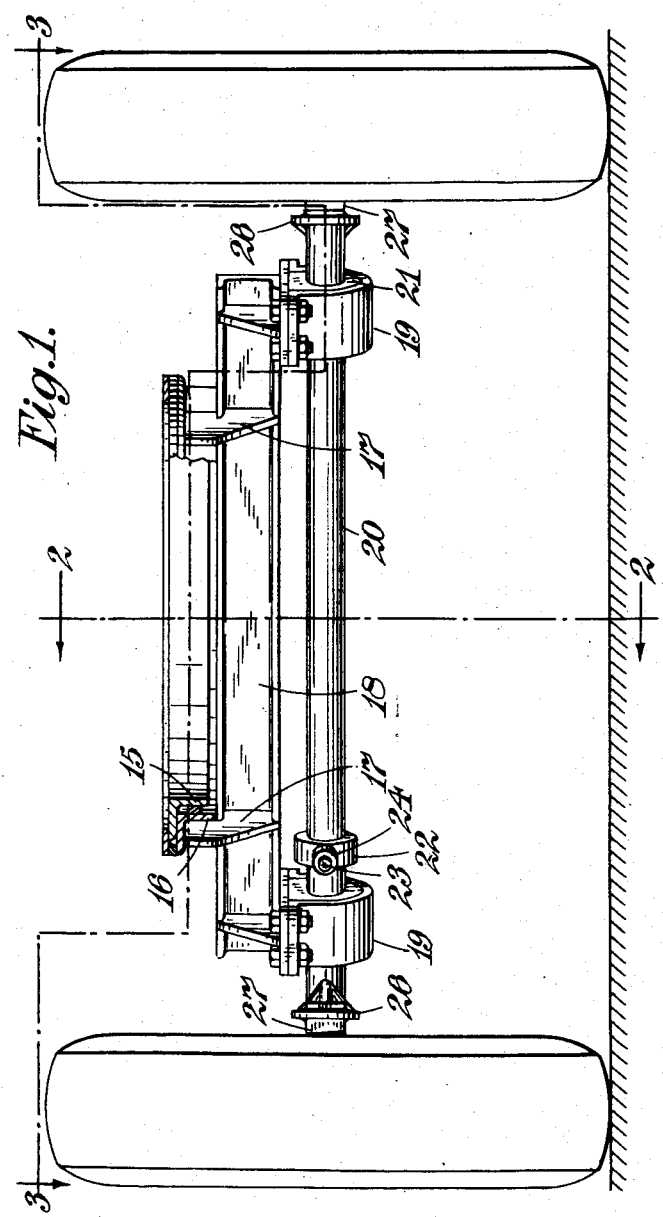
INVENTOR
S. E. Alley
By Watson, Cole, Grindle & Watson
ATTORNEYS Sept. 29, 1953   S. E. ALLEY   2,653,828
AXLE MOUNTING OF TRAILERS AND OTHER VEHICLES
Filed Nov. 14, 1950   4 Sheets-Sheet 2
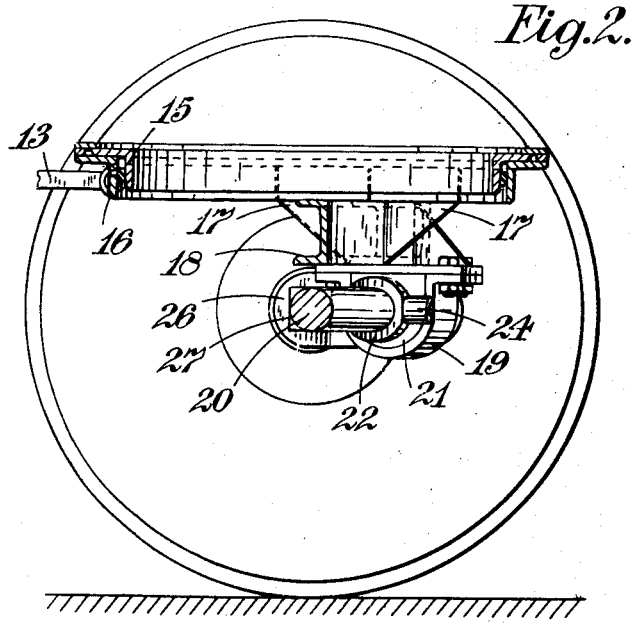
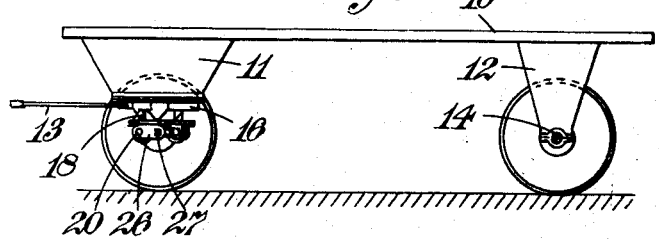
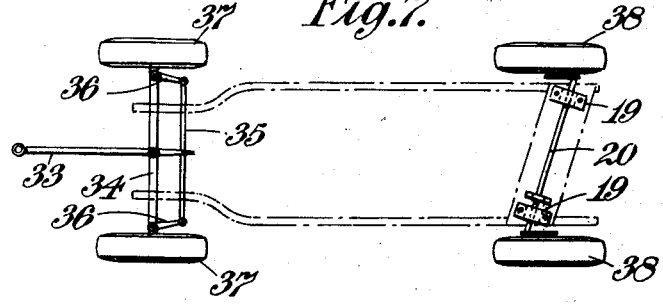
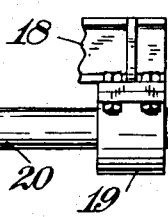
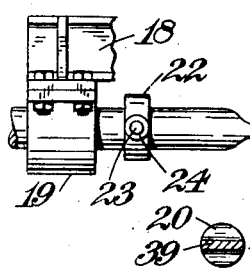

Sept. 29, 1953 S. E. ALLEY 2,653,828
AXLE MOUNTING OF TRAILERS AND OTHER VEHICLES
Filed Nov. 14, 1950 4 Sheets-Sheet 3
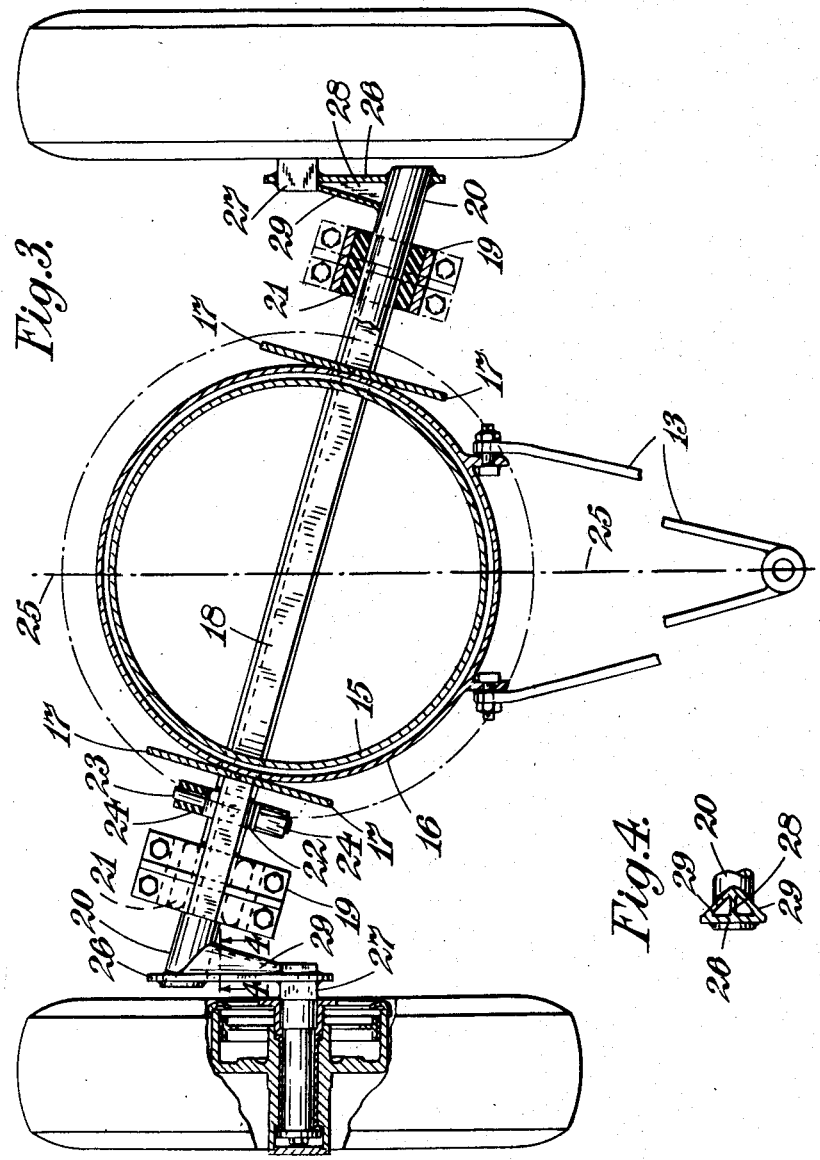
INVENTOR
S. E. Alley
By Watson, Cole, Grindle + Watson
ATTORNEYS Sept. 29, 1953 S. E. ALLEY 2,653,828
AXLE MOUNTING OF TRAILERS AND OTHER VEHICLES
Filed Nov. 14, 1950 4 Sheets-Sheet 4

INVENTOR
S. E. Alley
By Watson, Cole, Grindle & Watson
ATTORNEYS

Patented Sept. 29, 1953

2,653,828

UNITED STATES PATENT OFFICE 2,653,828

AXLE MOUNTING OF TRAILERS AND OTHER VEHICLES

Stephen Eric Alley, Burnham Market, Norfolk, England, assignor to Rubber By-Products (Warwickshire) Ltd., Birmingham, England, a British company Application November 14, 1950, Serial No. 195,575
In Great Britain December 15, 1948

4 Claims. (Cl. 280—104)

This invention is for improvements in axle mountings of trailers and other vehicles.

In so far as trailers having a turntable for steering or other purposes are concerned, it is well known that when the vehicle has to pass over uneven ground, the axle mounting is subjected to considerable strain, especially when the wheels are unsprung, the tendency being to warp the vehicle frame and body or to open the turntable on one side with resulting strain of the centre pin assembly. To avoid these drawbacks, it has been proposed either to pivot the axle centrally about a fore and aft axis below the turntable and to the latter, or to make the axle rigid with the lower part of the turntable and to pivot the upper part of the turntable to the body of the vehicle about a fore and aft axis.

The present invention has for one of its objects to provide a more efficient construction of vehicle axle mounting than has heretofore been available.

According to the primary feature of the invention there is provided a vehicle axle mounting comprising a shaft mounted in the vehicle in such manner that it lies horizontal when the vehicle is upon a horizontal surface and that when viewed in plan with the vehicle travelling straight ahead it extends from side to side of the vehicle at an obtuse angle relative to the longitudinal centre line of the vehicle, which shaft is supported in bearings which permit it to turn about its longitudinal axis, and which shaft has at its ends two parallel crank arms carrying outwardly-directed stub axles, one at each side of the vehicle, which crank arms are oppositely directed at such angles with respect to the shaft, and have the stub axles so positioned on them, that the stub axles are aligned or substantially so when viewed in plan. Thus, when one of the wheels traverses an obstacle, the rise of this wheel will act through the shaft and the crank arms to depress the wheel on the other side relatively to the vehicle body so that the latter will in fact be lifted by half the amount of the rise of the first-mentioned wheel, the axle mounting remaining horizontal and consequently no warping effect being transmitted to the vehicle body. The extent of permissible angular movement of the crank arms of course determines the limit of the height of an obstacle which can be traversed with the shaft remaining horizontal.

If desired the aforesaid shaft may be carried by one member of a turntable and the shaft may be provided with stops or checking devices to restrict the extent to which it can turn about its longitudinal axis, that is to say to restrict the angular motion of the crank arms.

In some circumstances it is advantageous to reduce the diameter of the shaft towards the middle of its length so as to provide torsional resilience between the two crank arms.

For a more complete understanding of the invention, there will now be described by way of example only and with reference to the accompanying drawings, certain constructional forms of axle mounting according to the invention. It is to be understood however, that the invention is not restricted to the precise constructional details set forth.

In these drawings:

Figure 1 is a front elevation, partly in section, of the fore part of a trailer standing upon horizontal ground and embodying the present invention, Figure 2 is a sectional elevation on the line 2—2 of Figure 1, Figure 3 is a plan, partly in section on the line 3—3 of Figure 1, Figure 4 is a detailed section on the line 4—4 of Figure 3, Figure 5 is a front elevation corresponding to Figure 1, but showing the position of the parts when the trailer has one of its wheels traversing an obstacle, Figure 6 is a side elevation of a trailer embodying the constructional details shown in Figures 1 to 5, but on a scale smaller than that of Figures 1 to 5. In Figure 6 the road wheels at one side of the vehicle have been removed.

Figure 7 is a plan, on a scale corresponding to that of Figure 6, but showing a modified construction of trailer incorporating the present invention, Figure 8 is a detailed elevation of a modified construction according to the invention, and Figure 9 is a section on the line 9—9 of Figure 8.

Like reference numerals indicate like parts throughout the drawings.

As shown in Figure 6, the trailer comprises a platform 10 having underneath it brackets 11 and 12 by which it is supported upon the front and rear road wheels, and also having a draw bar or coupling 13 by which it is attached to the tractor. The brackets 12 reach down to receive the rear axle 14 and the brackets 11 are received upon one member 15 of a turntable, the other member 16 of which has the draw bar 13 pivoted to it.

The member 16 of the turntable is welded to gusset plates 17 which are in turn welded to a channel bar 18. This channel bar 18 carries bearings 19 for a shaft 20. The bearings 19 may if desired have rubber liners 21 which apply a resilient check to rotation of the shaft 20 about its longitudinal axis in the bearings 19. A collar 22 secured to the shaft 20 carries stop arms 23 each with a rubber surround 24 which by engagement with the channel bar 18, as shown more particularly in Figure 5 will operate to prevent undue rotation of the shaft 20 in the bearings 19. As will be seen from Figure 3, when the vehicle is travelling straight ahead on a horizontal surface the shaft 20 is at an obtuse angle relatively to the longitudinal centre line 25—25 of the vehicle. As shown this angle is about 75°.

At each end of the shaft 20, there is welded in position a crank arm. These crank arms are parallel and are oppositely directed. As will be seen from Figure 4, each crank arm is a built up welded structure comprising a main plate 26 which is perforated at its ends so as to be received at one end upon the shaft 20 and at the other end to receive a stub axle 27, being welded both to the shaft 20 and to the stub axle 27. The plate 26 is stiffened by a rib 28 of triangular shape, as will be seen from Figure 3, and the edge of the rib is joined to the plate 26 by other stiffeners 29 as will be seen from Figure 4. The crank arm as thus built is fully capable of withstanding the stresses to which it is subjected. As seen in Figure 3, one crank arm extends forwardly and the other extends rearwardly. The length of the crank arms and their angular setting with respect to the shaft 20 and stub axles 27 are determined by the angular setting of the shaft 20 when travelling in the straight ahead position as seen in Figure 3, the stub axles 27 being so positioned on the crank arms that these stub axles are aligned or substantially so when viewed as in Figure 3.

So long as the vehicle is travelling over level ground, the position of the parts will remain as shown in Figure 1, but when one of the wheels traverses an obstacle as indicated at 30 in Figure 5, the shaft 20 will be caused to turn about its longitudinal axis, one of the crank arms being moved angularly upwards and the other being moved angularly downwards. The result of this is that although one wheel is raised by the height 31, of the obstacle, the vehicle body is only raised by the amount 32 which is half of the amount 31, while the shaft 20 still retains its horizontal position so that the various parts of the vehicle, and in particular the turntable, are not subjected to warping stresses.

Instead of applying the invention to the turntable of a trailer, the invention may be applied to the rear axle of a trailer. Such a construction is illustrated in Figure 7, in which a draw bar 33 applies the towing effort to the front axle 34 of the trailer and is continued behind this axle to a cross bar 35, which through arms 36 appropriately moves the steering wheels 37 of the trailer. The rear wheels 38 of the trailer are supported upon a shaft 20 with crank arms as described above. The bearings 19 in which the shaft 20 is supported, are rigidly mounted in the trailer framework and consequently the shaft 20 does not change its obliquity. It operates to maintain the rear end of the trailer horizontal despite the wheels 38 having to traverse inequalities in the ground, provided of course that these inequalities do not exceed the range capable of being dealt with by the angular movement of the crank arms.

In some circumstances it is advantageous to provide torsional resilience between the two crank arms and such a construction is shown in Figures 8 and 9 in which the middle of the length of the shaft 20 is reduced to blade formation at 39.

It is to be understood that the invention is not restricted to the precise constructional details set forth. For example the invention can be applied to vehicles other than trailers.

I claim:

1. A vehicle axle mounting comprising in combination a turntable, bearings on one member of the turntable, and a shaft received in said bearings to be rotatable about its longitudinal axis, which bearings are so located that the shaft lies horizontal when the vehicle is on a horizontal surface and that when viewed in plan with the vehicle travelling straight ahead it extends from side to side of the vehicle at an obtuse angle relatively to the longitudinal centre line of the vehicle, which shaft has at its ends two parallel crank arms carrying outwardly-directed stub axles one on each side of the vehicle, and which crank arms are oppositely-directed at such angles with respect to the shaft, and have the stub axles so positioned on them, that the stub axles are in substantial alignment when viewed in plan.

2. A vehicle axle mounting comprising in combination bearings on the vehicle, and a shaft received in said bearings to be rotatable about its longitudinal axis, which bearings are so located that the shaft lies horizontal when the vehicle is on a horizontal surface and that when viewed in plan with the vehicle travelling straight ahead it extends from side to side of the vehicle at an obtuse angle relatively to the longitudinal centre line of the vehicle, which shaft has at its ends two parallel crank arms carrying outwardly-directed stub axles one on each side of the vehicle, and which shaft is reduced in diameter towards the middle of its length so as to provide torsional resilience between the two crank arms which are oppositely-directed at such angles with respect to the shaft, and have the stub axles so positioned on them, that the stub axles are in substantial alignment when viewed in plan.

3. A vehicle axle mounting comprising in combination bearings on the vehicle and a shaft received in said bearings to be rotatable about its longitudinal axis, which bearings are so located that the shaft lies horizontal when the vehicle is on a horizontal surface and that when viewed in plan with the vehicle travelling straight ahead it extends from side to side of the vehicle at an obtuse angle relatively to the longitudinal centreline of the vehicle, which shaft has at its ends two parallel crank arms carrying outwardly-directed stub axles one on each side of the vehicle, and which crank arms are oppositely-directed at such oblique angles with respect to the shaft, and have the stub axles so positioned thereon at right angles thereto that the stub axles, when viewed in plan are in alignment at 90° to the longitudinal centre line of the vehicle when travelling straight ahead over a horizontal surface, the vertical plane of the stub axles intersecting said shaft midway between its ends.

4. A vehicle axle mounting according to claim 3, including checking devices to restrict the extent to which the shaft can rotate in said bearings.

STEPHEN ERIC ALLEY.

References Cited in the file of this patent

UNITED STATES PATENTS

| Number | Name | Date |
| --- | --- | --- |
| 2,404,121 | Black | July 16, 1946 |
| 2,534,256 | Fischer | Dec. 19, 1950 |